(12) United States Patent
 Bacon

(10) Patent No.: US 10,792,668 B1
(45) Date of Patent: Oct. 6, 2020

(54) METHOD AND APPARATUS FOR RECOVERING GERMANIUM FROM OPTIC FIBERS

(71) Applicant: NET RECYCLING LLC, Wilmington, NC (US)

(72) Inventor: Forrest Cleveland Bacon, Brownsburg, IN (US)

(73) Assignee: NET Recycling, LLC, Wilmington, NC (US)

( * ) Notice: Subject to any disclaimer, the term of this patent is extended or adjusted under 35 U.S.C. 154(b) by 379 days.

(21) Appl. No.: 15/812,697

(22) Filed: Nov. 14, 2017

Related U.S. Application Data

(63) Continuation-in-part of application No. 15/812,577, filed on Nov. 14, 2017.

(60) Provisional application No. 62/602,412, filed on Apr. 24, 2017.

(51) Int. Cl.
| | | |
|---|---|---|
| *B02C 19/00* | (2006.01) | |
| *C03B 37/018* | (2006.01) | |
| *C03B 37/014* | (2006.01) | |
| *H04B 10/032* | (2013.01) | |
| *B01D 63/06* | (2006.01) | |
| *B01D 61/14* | (2006.01) | |
| *B01D 61/18* | (2006.01) | |
| *B01D 53/46* | (2006.01) | |
| *B02C 23/00* | (2006.01) | |

(52) U.S. Cl.
CPC .......... *B02C 19/0056* (2013.01); *B01D 53/46* (2013.01); *B01D 61/147* (2013.01); *B01D 61/18* (2013.01); *B01D 63/06* (2013.01); *B02C 23/00* (2013.01); *C03B 37/0144* (2013.01); *C03B 37/01846* (2013.01); *H04B 10/032* (2013.01)

(58) Field of Classification Search
CPC .............................. B02C 19/0056; B02C 23/00
See application file for complete search history.

(56) References Cited

U.S. PATENT DOCUMENTS

| 3,705,694 | A | * | 12/1972 | Slocum | .................... B02C 23/08 241/14 |
|---|---|---|---|---|---|
| 5,951,712 | A | * | 9/1999 | Campbell | ........... B29B 17/0026 241/18 |
| 6,951,050 | B2 | * | 10/2005 | Maraszewski | ....... H01B 15/003 241/24.15 |
| 2012/0199677 | A1 | * | 8/2012 | Blo | ........................ B29B 17/02 241/65 |

(Continued)

*Primary Examiner* — Faye Francis
(74) *Attorney, Agent, or Firm* — The Humphries Law Firm, P.C.

(57) ABSTRACT

A method for processing strands of optic fiber in which a box containing one or more pairs of wheels either crush, cut or bend and break the strands of optic fiber before being transported to a separator. The separator can be positioned to deposit material onto a conveyor belt, into a storage container or into a separate structure known as a step-cleaner. The box can contain a pair of cutting and anvil wheels, a pair of drive wheels or a pair of wheels featuring teeth that cut, crush or bend the strands of optic fiber prior to a suction force removing them from the box and transporting them to the separator. A step cleaner contains one or more rotating wheels with tines that agitate and move the cut, broken or crushed fibers. The suction force is created by a blower operably connected to a passage that communicates with the separator.

10 Claims, 10 Drawing Sheets

(56) References Cited

U.S. PATENT DOCUMENTS

2019/0193086 A1\* 6/2019 Dijsselbloem ........ B02C 18/186

\* cited by examiner

METHOD AND APPARATUS FOR RECOVERING GERMANIUM FROM OPTIC FIBERS

CROSS-REFERENCE TO RELATED APPLICATIONS

This Application claims the benefit of priority to U.S. Provisional Application No. 62/602,412 filed on Apr. 24, 2017. The content of U.S. Provisional Application No. 62/602,412 filed on Apr. 24, 2017 is incorporated by reference in its entirety. This Application also claims the benefit of priority to U.S. Non-provisional application Ser. No. 15/812,577 filed on Nov. 14, 2017. The content of U.S. Non-provisional application Ser. No. 15/812,577 filed on Nov. 14, 2017 is also incorporated by reference in its entirety.

BACKGROUND OF THE INVENTION

(a) Field of the Invention

The present invention is in the technical field of industrial recycling. More particularly, the present invention concerns methods of recovering material from one or more stands of optic fiber—specifically germanium.

(b) Background Art

A strand of optic fiber is a high speed network cable that is made up of a number of single strands of optic fibers joined together in a protective jacket usually made of polymers. The individual strands of optic fibers are composed of an inner cylindrical core that is generally made of glass or plastic. The core is surrounded by a layer of a polymer, e.g. acrylic, referred to as cladding that prevents loss of light by reflecting light back into the core of the glass strand. The cylindrical core of an optic fiber confines a light signal to the pathway formed by the core such that light can be transmitted over long distances.

The transmission of the light signal depends on the materials making up the core and the cladding having different refractive indices. As a result, the chemical makeup of these materials is necessarily different. In addition, compounds are added to the core to reflect light back into the core rather than allowing it to escape leading to a loss of signal. Germanium-containing compounds such as germanium tetrachloride and germanium oxide are often added to the core to achieve these results.

Germanium is a semiconductor and has a number of uses outside of optic fibers including uses in electronic circuits, solar panels, cloth fibers, food containers and even x-ray lenses. Unfortunately, germanium is not naturally found in high concentrations. Moreover, the demand for germanium is increasing especially with the expansion of fiber optic cable based networks and as a result, the price of germanium is increasing. Some sources estimate that the United States will deplete its reserves of germanium in the next few years. With other countries like China instituting restrictions on the mining and trade of this element, other sources of germanium will continue to be needed.

Germanium can be recaptured from optic fibers, but the process is expensive and produces by-products known to be hazardous. Typically, the process involves burning the cladding surrounding the optic fiber core to separate the core and the cladding. Approximately 60% of the weight of the optic fiber consists of the acrylic cladding. Unfortunately, the U.S. Environmental Protection Agency (EPA) limits the amount of acrylic cladding that can be burned because the process produces toxic by-products. While overseas companies, including those in Germany, do not necessarily face the same restrictions, the cost associated with transporting the fibers to Germany and transporting the processed fibers back to the United States is cost prohibitive. As a result, the inventor developed methods of processing optic fibers such that the inner core could be separated from the outer cladding in a cost effective manner that does not produce waste products regulated by the EPA.

BRIEF SUMMARY OF THE INVENTION

The present invention describes an apparatus and method for processing strands of optic fibers for various uses including a method of processing optic fibers to produce a powder containing germanium.

This disclosure describes an apparatus and method for separating the outer cladding of a strand of optic fiber from the inner core of the same fiber so that the inner core can be processed into a form from which germanium can be harvested and that can be easily transported, distributed and/or sold. In addition, this application describes similar methods by which optic fibers can be cut or separated into segments that are more easily discarded. More specifically, the apparatus and method described in this application can be used in conjunction with the apparatus and method described in U.S. Non-Provisional patent application Ser. No. 15/812,577 and U.S. Provisional Application No. 62/602,412. Those applications describe an apparatus and method of removing strands of optic fiber from the spools on which they are stored. The spools can then be refurbished and used again. However, removing the strands of optic fiber produces large quantities of optic fiber that must be disposed of in a landfill. Unfortunately, such disposal creates certain hazards at the landfill, most notably, bundles of optic fiber can accumulate on machinery used in the landfill, preventing its efficient use. For example, optic fibers can hinder vehicles used in the landfill by entangling the wheels or tracks on which they move. Similarly, they can become entangled with the forks of a forklift or similar device used to move debris in a landfill. As a result, a method of processing the fibers such that they are easier to dispose, i.e. store in a landfill, was created by the inventor. In doing so, the inventor devised a new use for the discarded optic fibers, namely harvesting germanium from their inner cores.

Initially, the inventor devised methods to cut or break the optic fibers into segments which are much more easily disposed of in a landfill. Further experimentation revealed the fibers are very fragile and breakable when they are crushed rather than cut or broken. Finally, the inventor developed a method of crushing the optic fibers such that they could separate the inner core from the cladding and collect the crushed inner core.

As discussed in U.S. Non-Provisional patent application Ser. No. 15/812,577 and U.S. Provisional Application No. 62/602,412, the methods described in this disclosure begin with removing optic fibers from their respective spools and introducing them into a passage or pipe. In the preferred embodiments of the method, a box containing one or more wheels is positioned near the entry port of the passage such that the structures in the box process the strand of optic fiber before or shortly after the passage receives the same optic fiber(s). In one embodiment, the pair of wheels can consist of a bladed wheel and an anvil wheel. The bladed wheel is used to force a strand of optic fiber against the anvil wheel while at the same time cutting the strand of optic fiber into smaller lengths of optic fiber. The segmented optic fiber can be easily discarded in a landfill or can be used to reinforce building materials such as concrete. The spacing of the blades on the bladed wheel as well as the speed at which the wheels move can be adjusted to vary the length of the cut strands of optic fiber. This method can be used to produce very precisely cut, specific lengths of optic fiber.

In a second embodiment of the method, the box positioned at or near the entry of the passage includes wheels that bend and break the optic fibers into smaller pieces—similar to the resulting pieces of optic fiber produced by the cutting method above. Optic fibers are strong when a pulling force is applied to the fiber parallel to the central axis of the fiber, i.e., being pulled at both ends. However, optic fiber is rather fragile when it is bent at an angle and when a pulling force is applied to the bent portion of the optic fiber, it breaks. While the angle at which the optic fiber can be bent can vary with similar results being achieved, the inventor has determined that bending an optic fiber between 25 and 35 degrees, optimally 30 degrees, from the central axis of the fiber is optimal for achieving short strands of fiber through pulling or breaking.

In these embodiments, the bladed wheel and anvil wheels of the previously described embodiment are replaced with two wheels featuring teeth that are complementary to each other. The wheels are placed on a support structure that can be adjusted such that the wheels can be moved toward and away from each other. In addition, the wheels can be rotated so that the strands of optic fiber are bent by the teeth of the wheels while passing over or between the wheels. The pulling force necessary to break the optic fiber is produced further downstream. In preferred embodiments a blower is placed at one end of the passage and/or other equipment the optic fibers eventually pass through to create the suction that pulls the broken optic fibers through a pipe or passage that leads from the box containing the wheels to a collection point.

In yet another embodiment of the same apparatus, the box located proximate to the passage features hardened drive wheels also positioned on an adjustable support structure. As the fiber passes through the box and between the wheels, the wheels crush the individual strands of optic fiber prior to or immediately after the fiber passes through the rest of the passage. Depending on the amount of crushing force applied to the fiber optic strands, the fiber can be crushed such that the fibers become flexible and fragile or they can be crushed even further such that the outer cladding and inner core separate, i.e. the crushing force forces the outer cladding to expel the inner core. In the former instance, the partially crushed fibers are so fragile that they will break apart as they are transported through a passage via vacuum suction. Generally, placing the two drive wheels about 2 to 3 thousandths of an inch apart from each other produces crushed optic fiber that is flexible and fragile enough to be broken apart while being transported through the passage. Crushing the fiber between wheels that are half of one thousandth of an inch apart from each other crushes the fibers to the point the outer cladding expels the inner core which has at that point been crushed to a fine sand-like powder making it easy to separate the outer cladding from the inner core so that germanium can be harvested from the powdered core.

In preferred embodiments and the anticipated best mode of this device, a scraper is positioned adjacent to and/or in contact with the anvil wheel. The scraper can be seated on an adjustable support structure so that its position relative to the crushing wheels can be adjusted. The scraper scrapes away any accumulated outer coating or cladding and thus facilitates separation of the components; the scraper can also prevent the buildup of the outer cladding near the wheels. A skilled artisan can readily appreciate that the apparatus can be equipped with one or multiple pairs of wheels and/or scrapers. In addition, the scraper can be used with the drive and anvil wheel combination or the bladed and anvil wheel combination.

After the outer cladding and the inner core have been crushed, the processed fiber, which either consists of fragile and breakable crushed optic fibers or separated cladding and crushed inner core, is removed from the box and fed into the passage or pipe, generally via vacuum suction produced by a blower opposite end of the passage or pipe and/or a venturi vacuum. Vacuum suction can be used to provide the necessary force to pull the cut, broken or crushed optic fiber components into and through the passage to a separate conveyor belt, step-cleaner and/or separator. In preferred embodiments, the processed optic fibers are first introduced into a separator.

Once the crushed, broken or cut optic fiber components reach the separator, the powdered inner core of the optic fiber is separated from the flexible cladding jacket and deposited in a baler, Gaylord, other storage container. In preferred embodiments and the best mode of the device, the separator is a cyclone separator and can be equipped with a rotary airlock valve to facilitate separation. Specifically, the cyclone and rotary airlock direct the components of the optic fiber to a baler or other location and forces air out of the cyclone separator into filter bags that can capture any residual crushed, powdered core suspended in the air. The components passing through the separator can be deposited in the step-cleaner described below or into a separate structure or container.

After the fibers are crushed to the point the inner core is turned to powder and has become separated from the outer cladding, the separator deposits the processed optic fibers into a step cleaner. The step cleaner is an enclosed structure that features wheels featuring vanes. The wheels sort the crushed inner core from the outer cladding by tossing the processed fibers into the air as they gradually move the pieces of outer cladding from the entry point of the step-cleaner to its exit. While the pieces of broken or cut outer cladding are being transported through the step-cleaner, the crushed inner core falls to the bottom of the device to be collected by an augur conveyor. In preferred embodiments, the step-cleaner has a screen or filter that captures or catches the outer cladding, thus separating out the crushed powdered core. The cladding is typically considered waste that goes to a landfill while the powdered core can be processed to extract the germanium.

In preferred embodiments and the anticipated best mode, the separator is positioned to deposit processed optic fibers into more than one location. In other words, the separator features a gate that can be adjusted to deposit processed fibers into a storage container, onto a conveyor belt, and/or into the step-cleaner previously described. This design allows the equipment used to perform the disclosed methods to be adjusted depending on which of the processing methods are used to process optic fibers. To the extent the process has produced a powder of the plastic or glass that makes up the inner core of the fiber, this powder can be smelted or otherwise processed to harvest the components materials, such as germanium.

Approximately 3-4% of the weight of the powdered inner core consists of leftover outer cladding, i.e. acrylic residue.

Once the acrylic is burned off, the germanium can be harvested or extracted from the powder.

BRIEF DESCRIPTION OF THE SEVERAL VIEWS OF THE DRAWING(S)

DETAILED DESCRIPTION OF THE INVENTION

Figure 1:
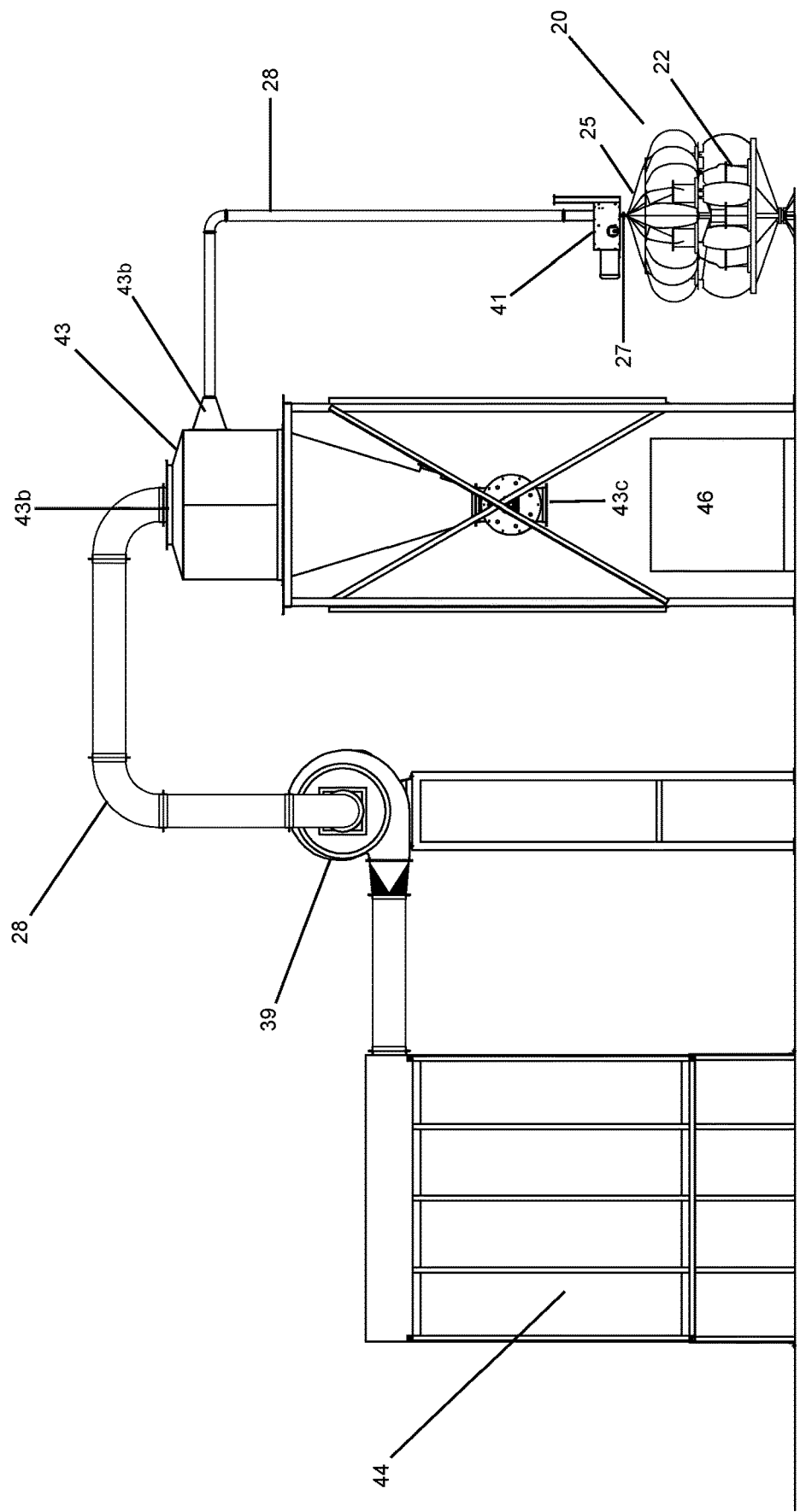
FIG. 1 is a side plan view of the equipment used in a first embodiment of the disclosed method.

Referring now to the invention in more detail, FIG. 1 shows an overview of a first embodiment of the presently disclosed methods. As discussed in U.S. Non-Provisional patent application Ser. No. 15/812,577 and U.S. Provisional Application No. 62/602,412, individual strands of optic fibers 25 are removed from their respective spools 22 and fed into the entrance 27 of an enclosed passage 28, for example, a metal pipe, and are transported through that passage 28 via vacuum suction created by a blower 39 located downstream from the spool tree 20. Positioned near the entrance 27 of the passage 28 is a box 41 containing one or more wheels (not shown) that chop, crush, bend and/or break the strands of optic fiber 25 as they are removed from their spools 22. The details of the components of the box 41 will be discussed later.

FIG. 1 also shows the passage 28 terminating into a separator 43. The separator 43 contains within it a rotary airlock valve (see FIG. 4) that releases the free falling optic fiber components without allowing moving air to move through the product exit 43c in either direction. Filter bags 44 serve to capture any residual airborne powdered inner core that results from processing the optic fibers 25. At the same time, the rotary airlock valve causes the processed optic fibers 25 to be deposited into a storage container 46.

Figure 2:
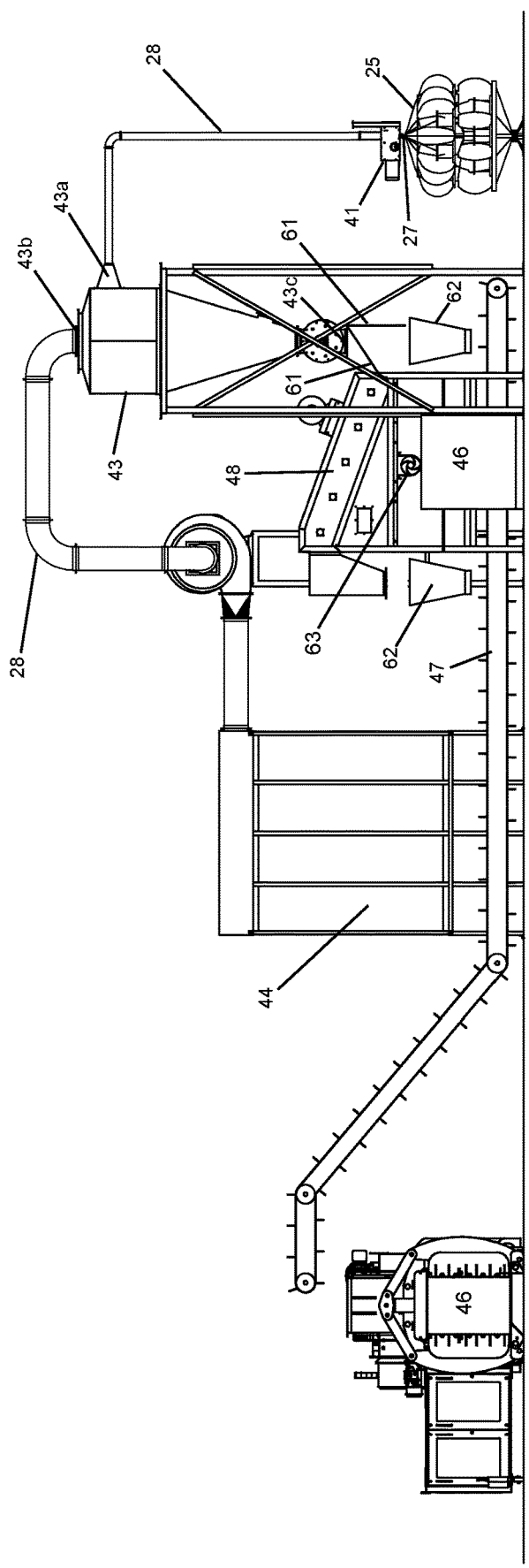
FIG. 2 is a side plan view of the equipment used in a second embodiment thereof.

FIG. 2 shows an overview of a second embodiment of the methods described in this document and reflects the inventor's anticipated best mode of operation. More specifically, the process begins with the removal of individual strands of optic fibers 25 from individual spools 22 located on a spool tree 20 described in U.S. Non-Provisional patent application Ser. No. 15/812,577 and U.S. Provisional Application No. 62/602,412. Optic fibers 25 leaving the spool tree 20 enter a box 41 containing one or more types of wheels (not shown) used to either, bend and break, cut or crush the strands of optic fibers 25, before or after the strands of optic fiber 25 pass into the entrance 27 of the enclosed passage 28. The processed fibers that result are then sucked into the portion of the passage 28 that leads into a separator 43 just as in the first embodiment. The separator 43 has an adjustable gate 61 that can be positioned to direct falling optic fiber components that leave the separator 43 into a storage container 46, onto a conveyor belt 47 or into a step cleaner 48. The falling optic fiber components are directed to fall into a transfer chute 62 that is a funnel-line structure that guides the falling material to a particular location. The separator 43 also forces air containing some amount of crushed optic fiber core into filter bags 44 that serve to catch the residual powdered inner core.

Figure 3:
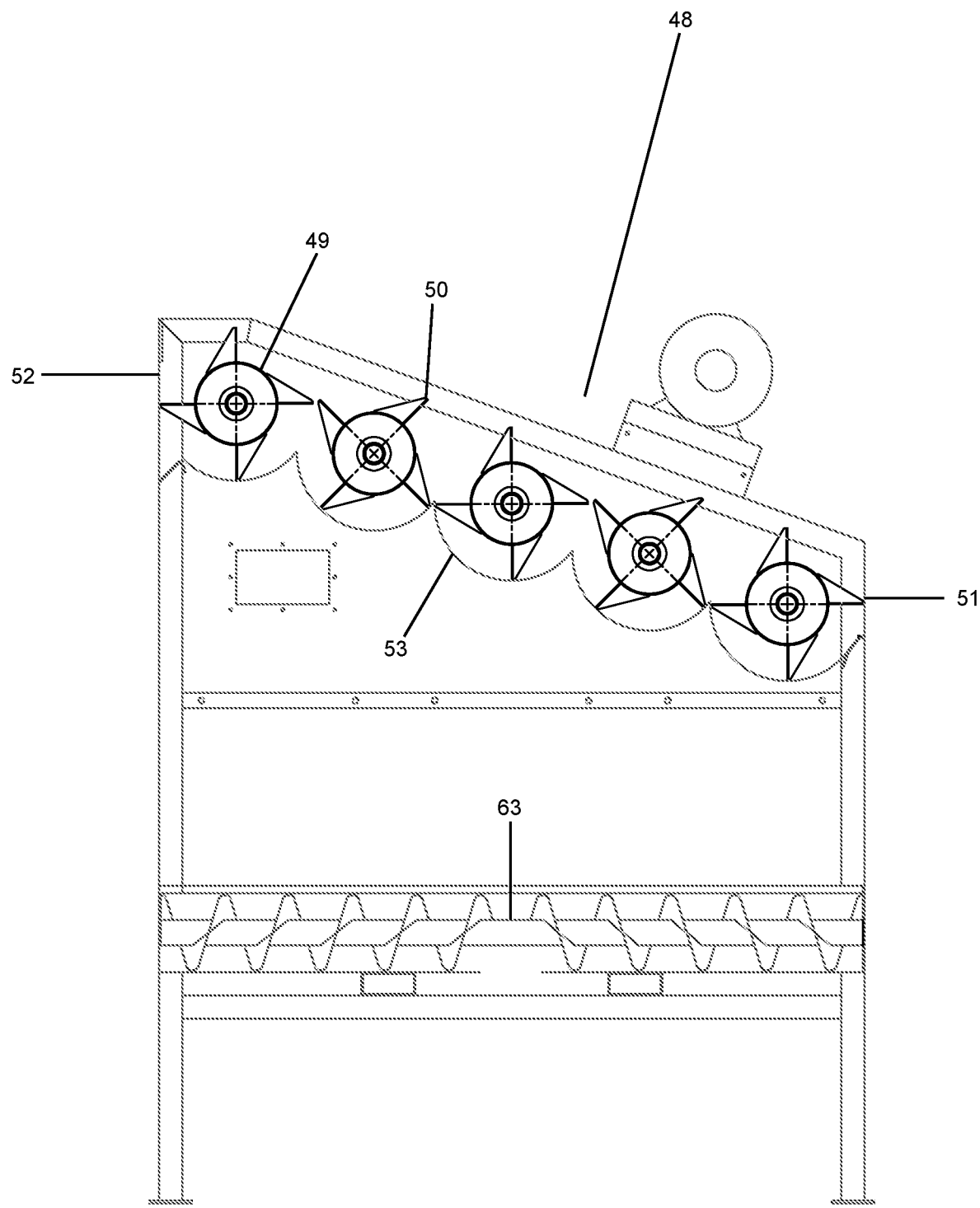
FIG. 3 is a cross section of the step cleaner used in various embodiments thereof.

The step cleaner, generally 48, is more fully shown in FIG. 3. The step cleaner 48 has a plurality of wheels 49 featuring tines 50 that serve to manually manipulate and move the processed fibers (not shown) from the entrance 51 of the step cleaner 48 to its exit 52. In doing so, the wheels 49 featuring tines 50 agitate the processed fibers and serve to keep them airborne, i.e., the tines throw the processed optic fibers up into the air and towards the next wheel 49 helping to separate any crushed inner core from the outer cladding. When and if cut or broken fibers are passed into the step-cleaner 48, the physical agitation will serve to dislodge additional inner core that has been inadvertently crushed or powdered. When the inner core of the cut and broken fibers is not harvested for germanium extraction, the processing results in a possible additive to building materials such as concrete and/or waste that is more easily discarded in a landfill than the unprocessed optic fibers tend to be.

Below the wheels 49, the step cleaner 48 can also feature a screen 53 that serves to filter the powdered inner core from the outer cladding as it falls into an augur conveyor 63 located at the bottom of the step cleaner 48. The augur conveyor features a screw blade, also called a flighting, that serves to move the powdered inner core that falls into the augur conveyor out of the bottom of the step cleaner 48. In preferred embodiments, the powdered inner core that leaves the step cleaner 48 enters a second augur conveyor 63 below the step cleaner 48. The second augur conveyor 63 moves the powdered inner core into position to fall into a container 46 or onto a conveyor belt 47.

Referring back to FIG. 2, the separator can also be used to deposit processed, specifically cut, broken or partially crushed optic fibers onto a conveyor belt 47. Similarly, the separated outer cladding (not shown) that leaves the step cleaner 48 can also be deposited on the same or a different conveyor belt 47. In the anticipated best mode, the separator can be positioned such that it can be adjusted to deposit processed optic fibers directly onto the conveyor belt 47, into a storage container 46 or into the step cleaner 48. In addition, the air from the separator 43 can be blown into filter bags 44 that catch any extra dust resulting from crushing the inner core of the fibers. The conveyor belt 47 is used to move any remaining remnants of the processed fibers to a storage container 46.

Figure 4:
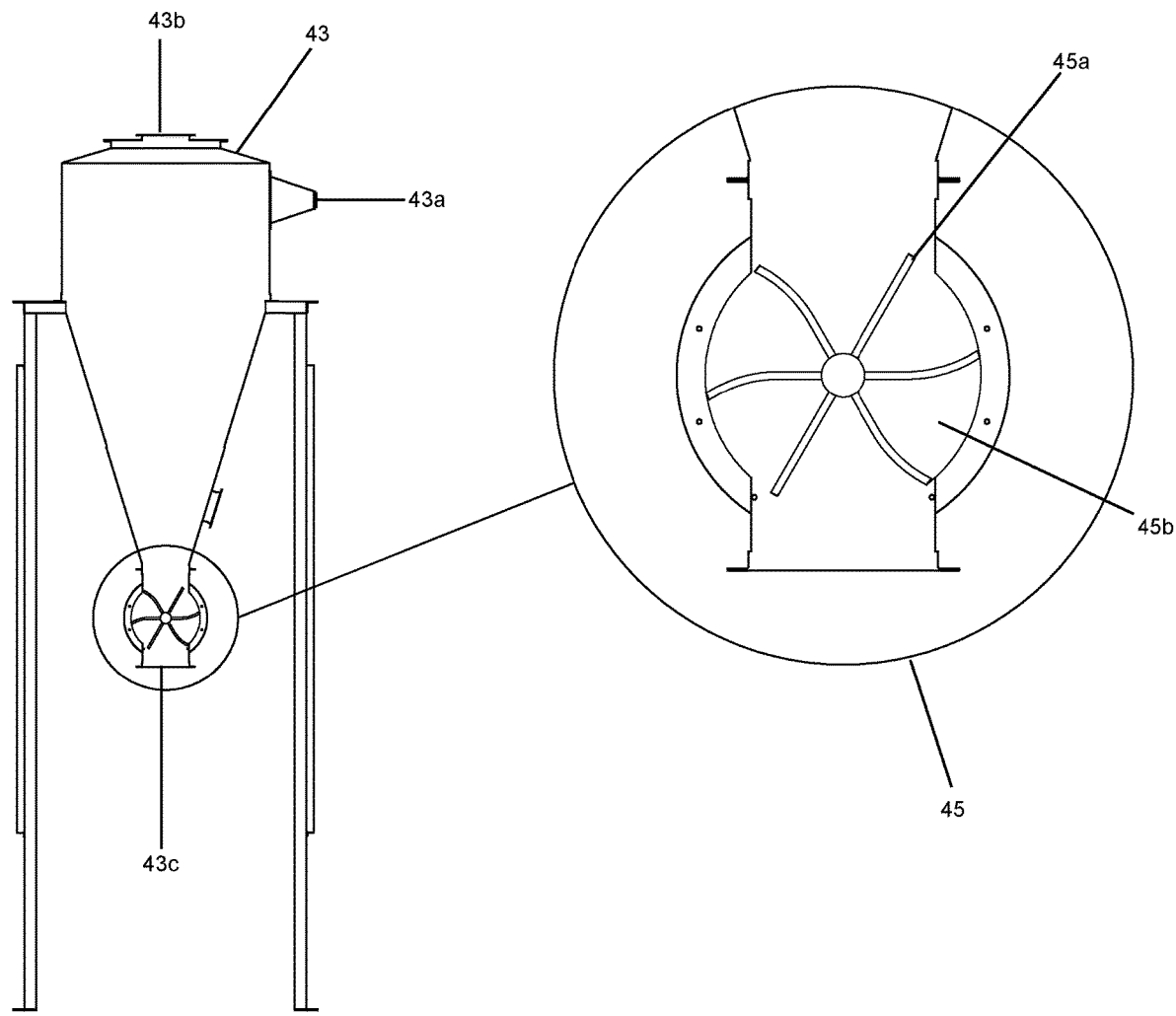
FIG. 4 is a cross section of the separator used in various embodiments thereof.
Figures 5A, 5B:
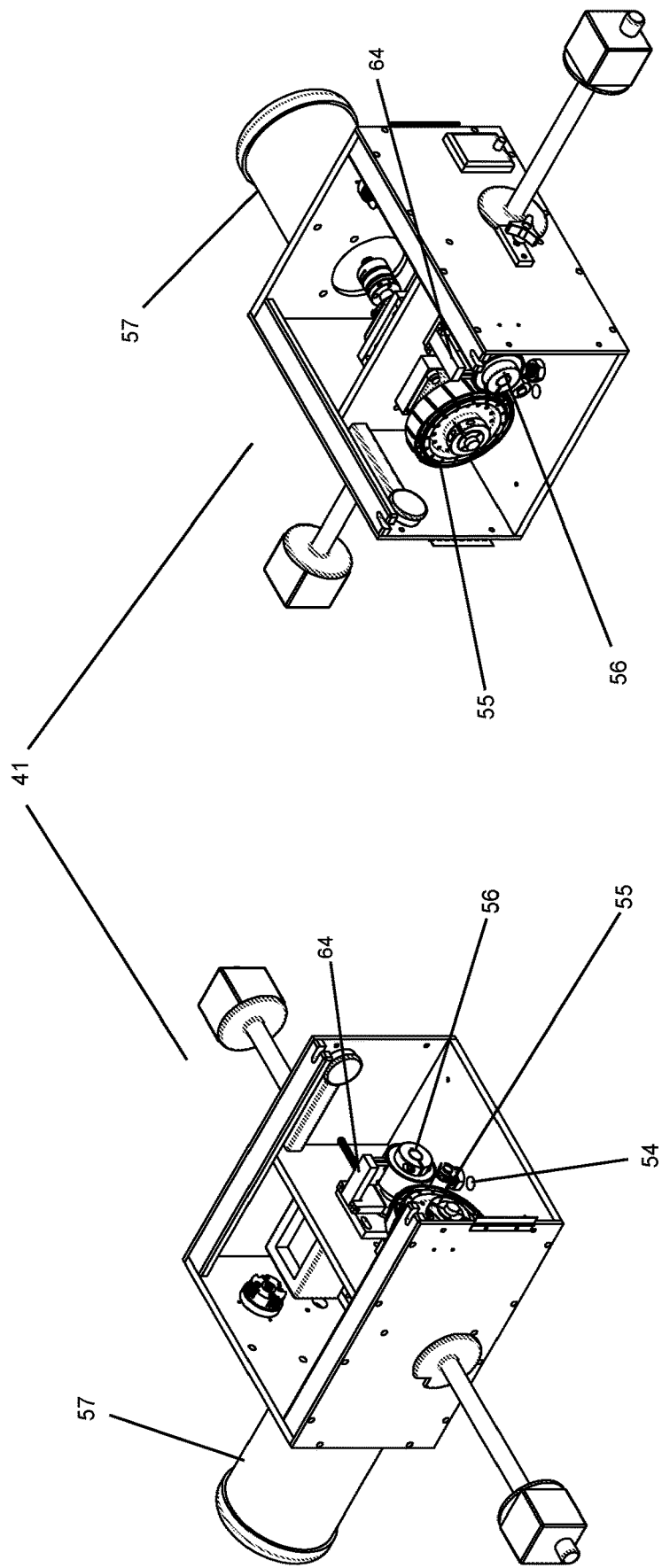
FIGS. 5A and 5B show perspective views of the box featuring a cutting blade and anvil blade.
Figure 6A:
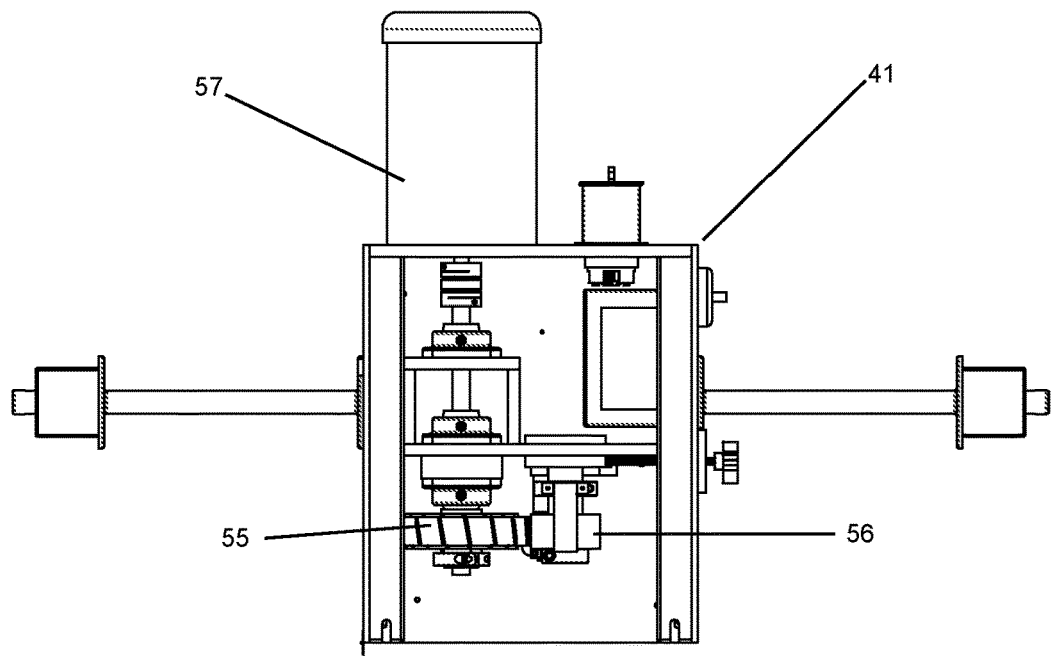
FIG. 6A is a top plan view of the inside of the box featuring a cutting wheel and an anvil wheel.
Figure 6B:
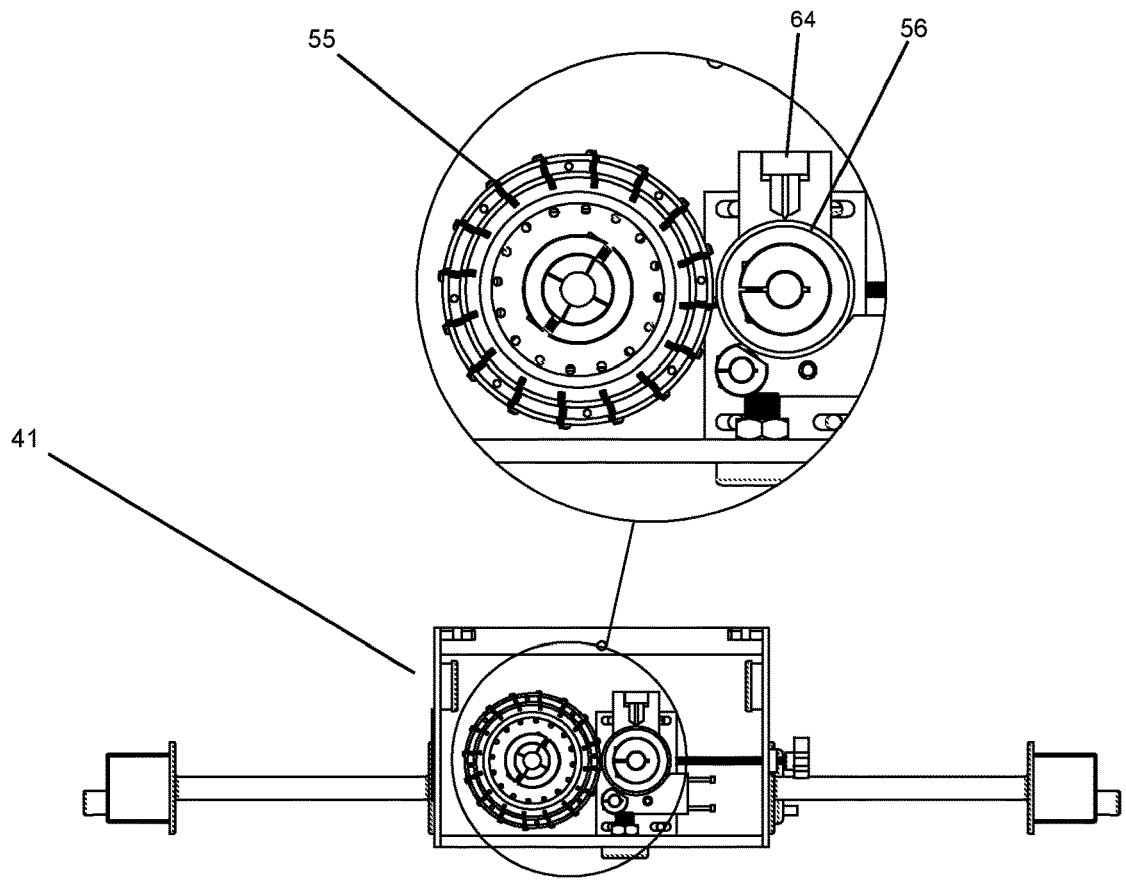
FIG. 6B is a front plan view of the inside of the box featuring a cutting wheel and an anvil wheel.
Figure 7B:
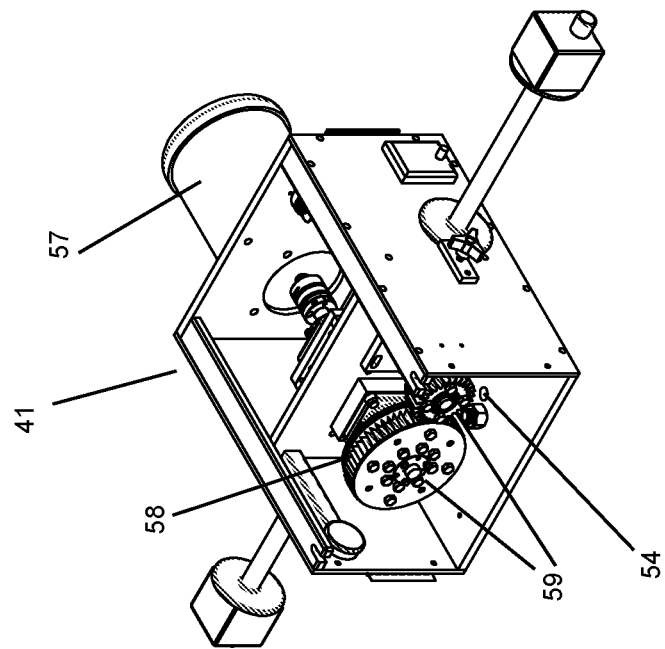
FIGS. 7A and 7B show perspective views of the box having two wheels featuring teeth.
Figure 7A:
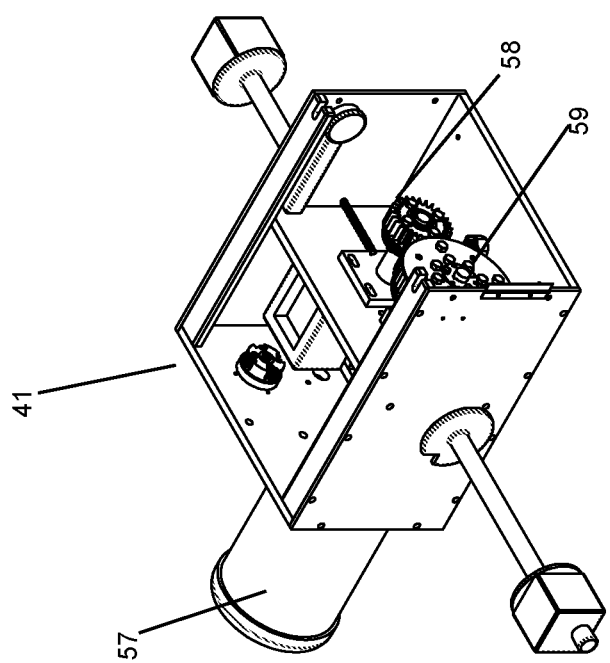
Figure 8A:
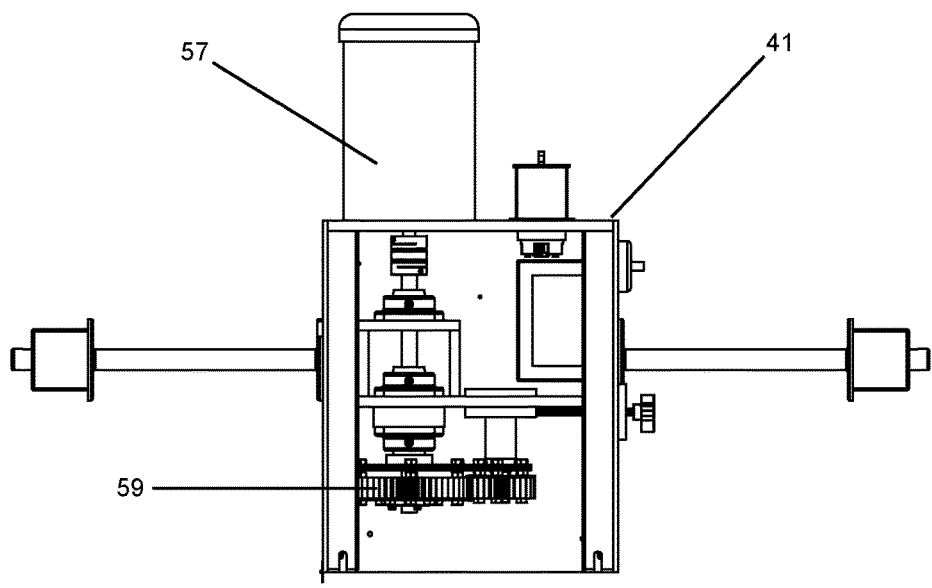
FIG. 8A is a top plan view of the inside of the box having two wheels featuring teeth.
Figure 8B:
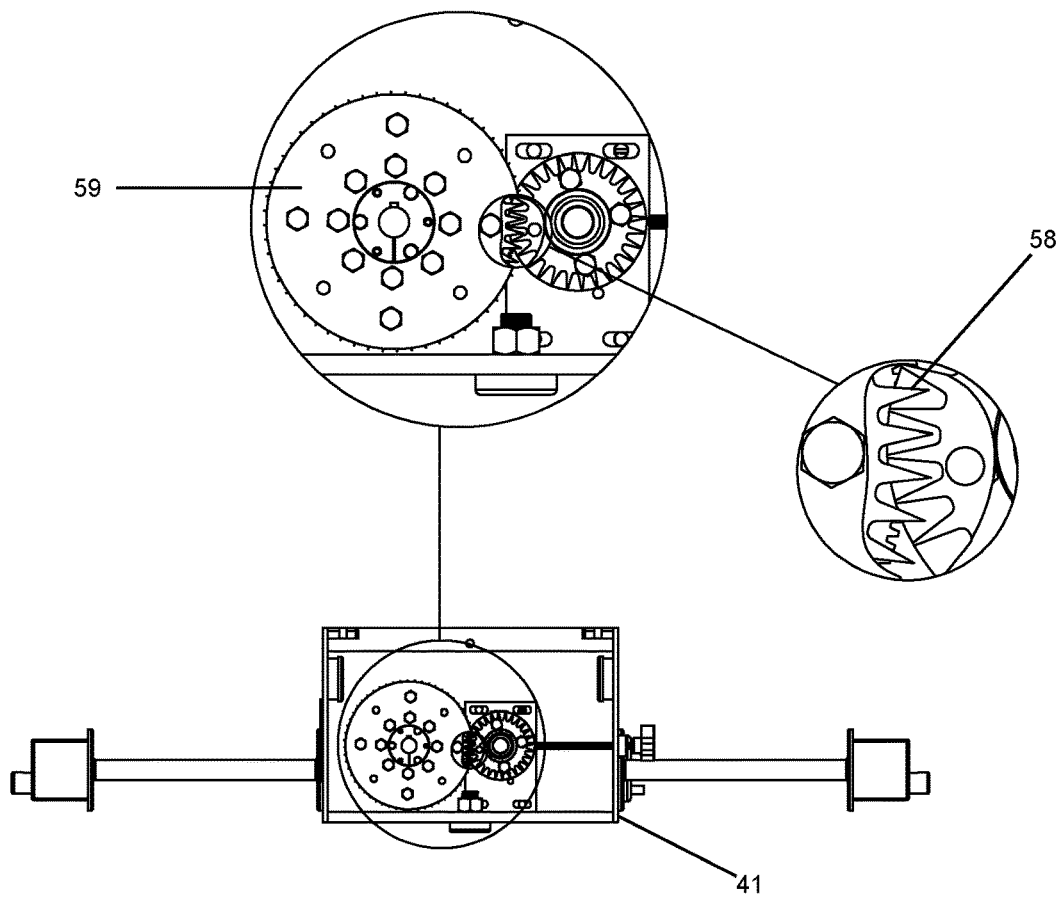
FIG. 8B is a front plan view of the inside of the box having two wheels featuring teeth.
Figure 9B:
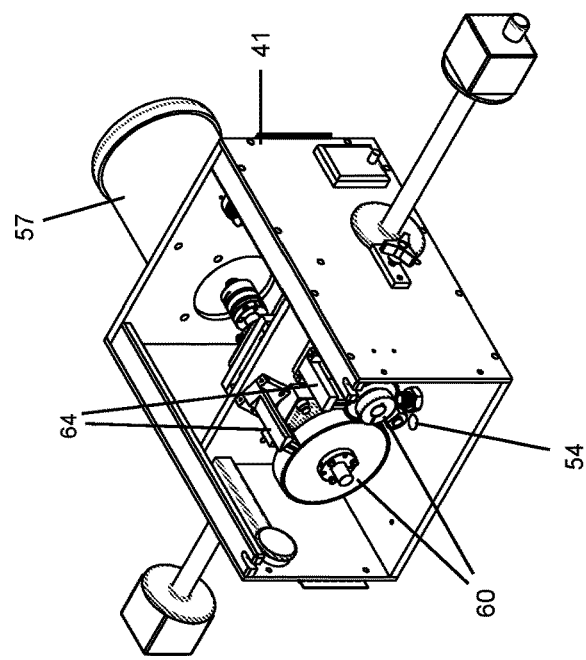
FIGS. 9A and 9B show perspective views of the box featuring two drive wheels.
Figure 9A:
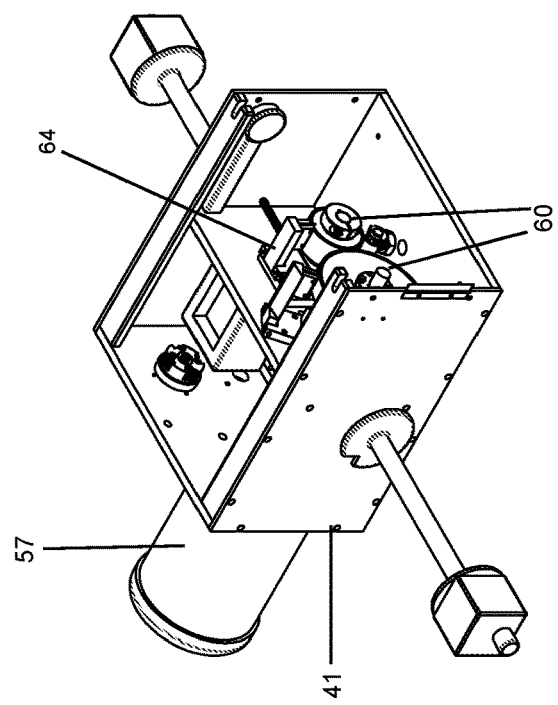
Figure 10A:
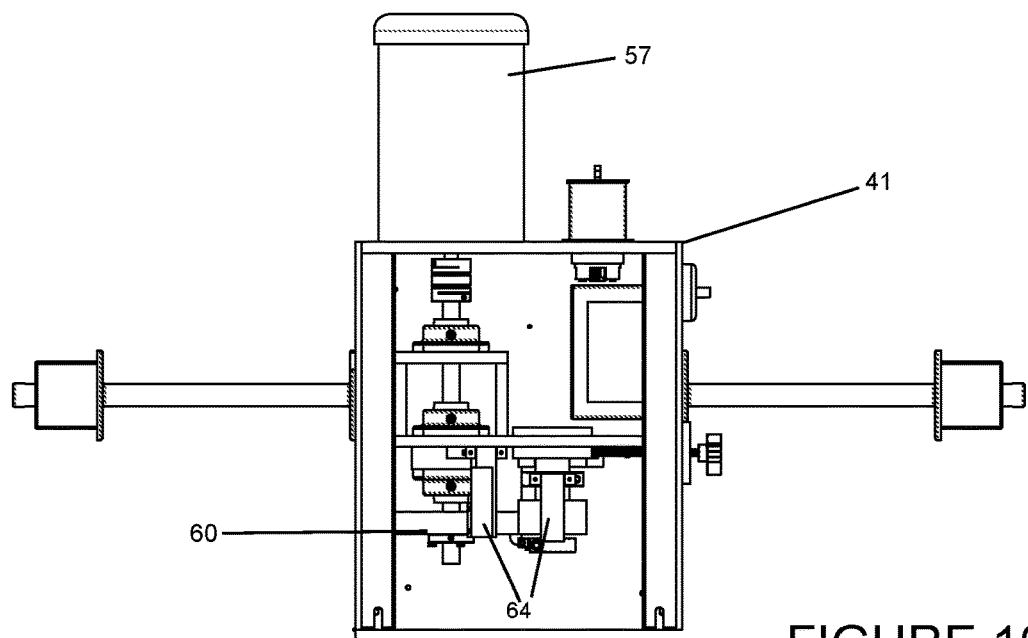
FIG. 10A is a top plan view of the inside of the box featuring two drive wheels.
Figure 10B:
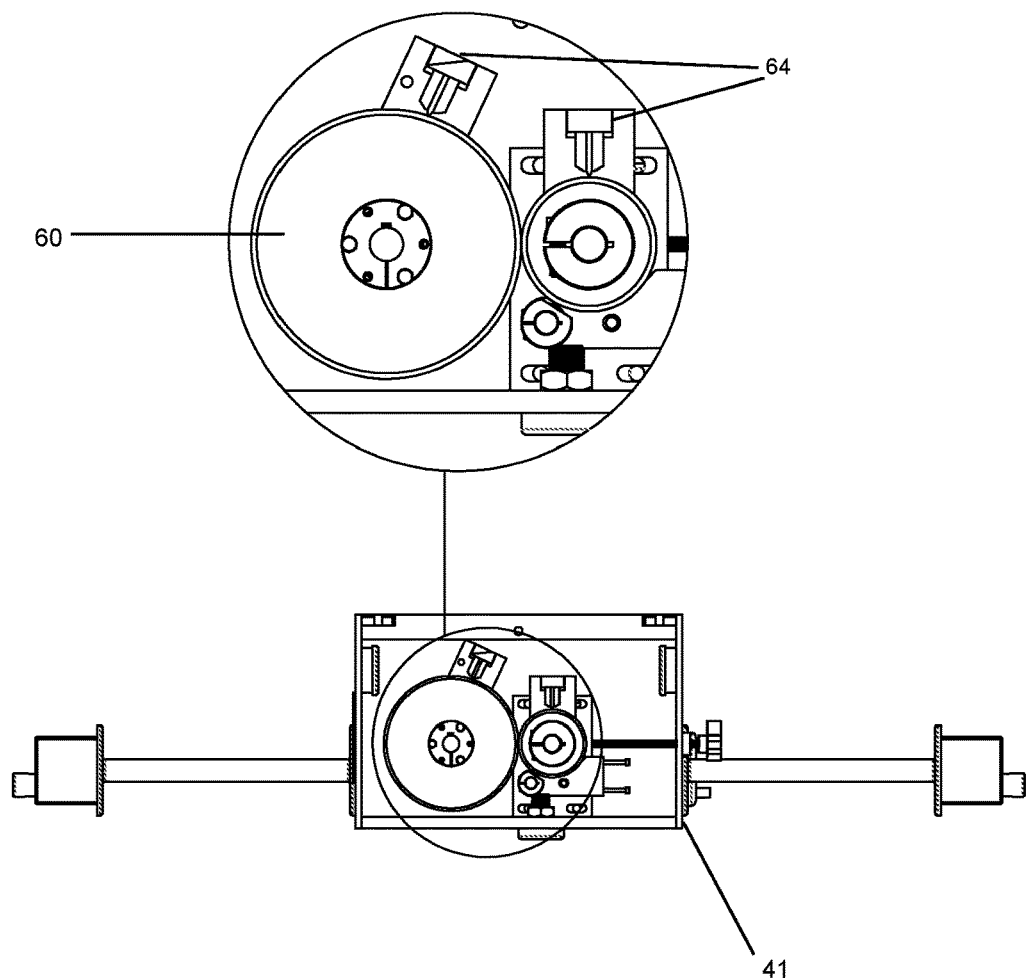
FIG. 10B is a front plan view of the inside of the box featuring two drive wheels.

FIG. 4 shows a cross section of the separator 43. The separator 43 features an entry port 43a, an air exit 43b, a product exit 43c and a rotary airlock valve 45. The rotary airlock valve 45 consist of a number of vanes 45a that rotate as material is introduced into the interior of the separator 43 through the entry port 43a. Optic fiber components enter the separator 43, circulate in the interior of the separator 43, and fall to the bottom and out of the product exit 43c at the bottom of the separator 43. By rotating, the vanes 45a form pockets, 45b into which material enters and is spun or rotated by the rotating vanes 45a. The rotary airlock 45 serves to prevent air from entering the product exit 43c at the bottom of the separator. Without it, the decreased air pressure inside the separator would allow air to enter the product exit 43c interfering with the optic fiber components falling out of the same exit 43c under the force of gravity. The separator 43 has an air exit 43b that communicates with and is connected to another passage (28 in FIGS. 1 and 2) and an air suction blower (39 in FIGS. 1 and 2). The air suction blower 39 provides the vacuum or suction force that pulls the strands of optic fiber (not shown) from the spool tree (not shown) into the passage 28 that leads to the separator entrance 43a.

FIGS. 5A, 5B, 6A and 6B show the box 41 that initially process the strands of optic fiber (not shown) as used in different embodiments of the inventive method. From the passage (not shown), the fibers are transported into a box 41 via an opening 54 (FIGS. 6A and 6B) where they then encounter a bladed wheel 55 and an anvil wheel 56 mounted within the box 41. The two wheels 55 and 56 are operably connected to a motor 57 that rotates the wheels 55, 56 when activated. Strands of optic fibers entering the box 41, pass between the bladed wheel 55 and the anvil wheel 56 cutting the strands of optic fiber into pieces (not shown). As discussed above, the wheels 55, 56 can be adjusted to vary their speed and the distance between them to vary the lengths of the pieces of cut optic fiber. In preferred embodiments, the blades are carbide blades or diamond coated blades. A scraper 64 can be positioned adjacent to and/or in contact with the anvil wheel 56. The scraper 64 can be seated on an adjustable support structure so that its position relative to the wheels 55, 56 can be adjusted. The scraper 64 scrapes away any accumulated outer coating or cladding and thus facilitates separation of the components; the scraper 64 can also prevent the buildup of the outer cladding near the wheels.

FIGS. 7A 7B, 8A and 8B show the box 41 used in another embodiment of the inventive method. Similar to the embodiment discussed above, the fibers are transported into a box 41 via an opening 54 (FIGS. 7A and 7B) where they then encounter two wheels 59 featuring complementary teeth 58 positioned close enough to each other that the sets of teeth 58 each pass between the sets of teeth 58 on the opposing wheel as the two wheels 59 rotate. The two teethed wheels 59 are operably connected to a motor 57 that rotates the teethed wheels 59 when activated. Strands of optic fibers entering the box 41, pass between the teeth 58 of the two wheels 59 which causes them to bend relative to the longitudinal axis of the optic fiber. The vacuum produced by the blower (not shown) located downstream of the box 41 pulls the bent strands of optic fiber out of the box and into the enclosed passage (not shown) that leads to the separator (not shown).

As previously discussed, strands of optic fiber are extremely fragile when they are pulled while bent relative to their longitudinal axis. As the strands of optic fiber 25 move between the teeth 58 of the two wheels 59, they are bent and pulled apart by the teeth 58. The timing of the wheels 59 can be adjusted as can the number of teeth 58 on the wheels 59 and doing so will change the length of the pieces of optic fiber 25, but this process is not well-suited to producing a specific length of optic fiber 25—the cutting method previously described is better suited for that use.

FIGS. 9A 9B, 10A and 10B show the box used in another embodiment of the inventive method. In this iteration of the box 41 the strands of optic fiber (not shown) entering the box 41 are acted upon by two drive wheels 60 that rotate in opposite directions, i.e., one wheel 60 rotates clockwise while the other wheel 60 rotates counterclockwise such that the wheels 60 are rotating inward toward each other and are positioned close enough to each other to crush the incoming strands of optic fiber. Alternately, one drive wheel 60 could be replaced with another surface other than a drive wheel 60 against which the first drive wheel 60 crushes the fibers; however, preferred embodiments use pairs of drive wheels 60. The drive wheels 60 are operably connected to a motor 57 that rotates the drive wheels 60 when activated. A scraper 64 can be positioned adjacent to and/or in contact with the drive wheel(s) 60. The scraper 64 can be seated on an adjustable support structure so that its position relative to the wheels 60 can be adjusted. The scraper 64 scrapes away any accumulated outer coating or cladding and thus facilitates separation of the components; the scraper 64 can also prevent the buildup of the outer cladding near the wheels 60.

Decreasing the distance between the two drive wheels 60 crushes the strands of optic fiber to the point at which the outer cladding expels the inner core and the inner core is crushed to a powder having the consistency of fine sand. The outer cladding and the powdered inner core are then pulled into the enclosed passage (not shown) via the vacuum force produced by the blower (not shown). Alternately, the distance between the two wheels 60 can be increased such that when the strands of optic fiber are crushed between the two drive wheels 60, the inner core is not crushed to the point of being expelled from the outer cladding, i.e. producing partially crushed optic fibers. The partially crushed optic fibers are very fragile and breakable and they break into pieces or segments of partially crushed optic fibers when they experience the force of the vacuum produced by the blower downstream in this process.

This last embodiment can be used to process multiple strands of optic fiber as more than one strand and at least 16 strands can be crushed at the same time between the drive wheels 60. While there is likely a practical limit to the number of strands of optic fiber that can be crushed per width of drive wheel 60, the inventor envisions using drive wheels of increasing width to increase the number of strands of optic fiber, and consequently, the number of spools of optic fiber, that can be processed at once. Currently the inventor knows that by using diamond coated drive wheels 60 with a one half inch width of diamond coating can be used to process at least 16 strands of optic fiber at a time. In preferred embodiments and the anticipated best mode of this embodiment of the method, the width of the diamond coating on the drive wheels 60 is the same or comparable to the diameter of the opening 54 of the box 41 through which the stands of optic fiber enter.

In broad embodiment, the present invention is a novel method for processing strands of optic fiber after they are removed from spools. The advantages of the present invention include, without limitation, the ability to turn strands of optic fibers that are miles long into smaller segments that can be discarded in a landfill without the problems associated with disposing of the unprocessed strands of optic fibers. In addition, the disclosed methods are used to produce a valuable product from optic fibers that would be otherwise discarded, namely the Germanium containing powder or dust.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method for processing one or more strands of optic fiber having an outer cladding and an inner core to expose a germanium containing product comprising:
   providing at least one wheel operably connected to a motor capable of rotating the wheel and at least one other surface;
   crushing the one or more strands of optic fiber between the at least one wheel and the at least one other surface; and
   applying enough crushing force with the at least one wheel to crush the one or more strands of optic fiber to the point at which the inner core is crushed to a powder containing germanium thereby separating the outer cladding and the inner core.

2. The method of claim 1 wherein the at least one other surface is a second wheel operably connected to a motor capable of rotating the second wheel.

3. The method of claim 2 wherein an outer surface of the at least one wheel features a diamond coating.

4. The method of claim 3 further comprising:
   introducing the crushed inner core and the crushed outer cladding into a step cleaner that contains at least one rotating wheel featuring tines;
   agitating the outer cladding to remove any crushed inner core present in the outer cladding using the wheels with tines; and
   moving the crushed outer cladding with the wheels with tines to an exit where the crushed outer cladding is deposited on a conveyor belt.

5. The method of claim 3 further comprising adjusting the separator's position to deposit broken strands of optic fiber alternately into a step cleaner or onto a conveyor belt.

6. The method of claim 5 further comprising:
   introducing the crushed strands of optic fiber into a step cleaner that contains at least one rotating wheel featuring tines;
   agitating the outer cladding to remove any crushed inner core present in the outer cladding using the wheels with tines; and
   moving the crushed outer cladding to an exit where it is deposited on a conveyor belt by the wheels with tines.

7. The method of claim 1 further comprising:
   creating suction to transport the crushed inner core and outer cladding through a passage to a separator;
   using said separator to move air through at least one filter bag that captures some of the crushed inner core in the air;
   using said separator to transport the outer cladding and the remainder of the crushed inner core to a step-cleaner or a conveyor belt.

8. The method of claim 7 further comprising:
   separating the crushed inner core from the outer cladding in the step cleaner using a screen or filter.

9. The method of claim 1 further comprising:
   applying enough crushing force with the at least one wheel to crush the one or more strands of optic fiber to the point at which the one or more strands of optic fiber becomes brittle.

10. The method of claim 9 further comprising:
    using suction to create the pulling force that causes the one or more crushed strands of optic fiber to break apart;
    using suction to transport the broken strands of optic fiber from the box through a passage to a separator;
    using said separator to force air through at least one filter bag that captures any airborne material; and
    using said separator to transport the broken strands of optic fiber to a second exit.

* * * * *